United States Patent [15] 3,644,269
Hoyt et al. [45] Feb. 22, 1972

[54] COLLAPSIBLE MOLD AND MOLDING COMPOSITIONS

[72] Inventors: Howard Eugene Hoyt, Huntingdon Valley, Pa.; Robert B. Dean, Cincinnati, Ohio

[73] Assignee: Borden, Inc., New York, N.Y.

[22] Filed: Nov. 5, 1969

[21] Appl. No.: 871,528

Related U.S. Application Data

[63] Continuation of Ser. No. 463,342, June 11, 1965, abandoned, which is a continuation of Ser. No. 856,345, Dec. 1, 1959, abandoned.

[52] U.S. Cl. ..............................260/38, 164/34, 260/51 R, 260/DIG. 40
[51] Int. Cl. ..........................................................C08g 5/10
[58] Field of Search.........................260/51, 57, DIG. 40, 38; 164/126, 34

[56] References Cited

UNITED STATES PATENTS 1,609,367  12/1926  Kulas et al. ..............................260/51
1,614,172  1/1927   Amann et al. ...........................260/51
1,777,998  10/1930  Dent et al. .......................260/DIG. 40
2,807,556  9/1957   Stark ........................................260/51
3,461,941  8/1969   Schumacher..........................164/131

OTHER PUBLICATIONS

R. W. Martin, The Chemistry of Phenolic Resins, John Wiley & Sons, Inc. pages 87– 88.

Primary Examiner—Morris Liebman
Assistant Examiner—S. M. Person
Attorney—John L. Sigalos and Paul Lempel

[57] ABSTRACT

This invention relates to molding compositions, collapsible molds made therefrom, and the method of making such molds wherein granules of a solid nonabsorbent material are coated with a nontacky layer comprising a potentially unstable thermosetting resin selected from the group consisting of the reaction products of formaldehyde with an isoalkylidene bisphenol and formaldehyde with phenol and an isoalkylidene bisphenol, said resin being an alkaline condensation product which has not been precipitated in acid.

9 Claims, No Drawings

COLLAPSIBLE MOLD AND MOLDING COMPOSITIONS

This application is a continuation of application Ser. No. 463,342, filed June 11, 1965, which was a continuation of Ser. No. 856,345, filed Dec. 1, 1959, both now abandoned.

In shell and core molding using conventional phenolic resin bonded sand, removal of the outside shell from the casting is usually easy and complete at points adjacent to the heavier sections of the cast metal where the shell has been made friable and readily collapsible by the hot metal. With castings having high points of low-heat capacity, however, seizure and difficulty are encountered in removing the resin bonded sand mold; i.e., there is poor or no collapsibility. Core inserts of resin bonded sand are even more difficult to remove because of their location within the casting and the fact they retain considerable strength after casting of the metal thereagainst. These difficulties arise particularly in the molding of metals such as aluminum and magnesium, which are cast at relatively low temperatures.

Attempts to overcome these difficulties by the addition of such unstable heat-sensitive substances such as sugar, flour and urea resin to the conventional phenolic binders have not been wholly satisfactory in that the strength of shells and cores formed from the thus modified phenolic bonded sand is greatly impaired.

The present invention provides resin coated sand or the like for foundry shell molds and core inserts having adequate strength at the mold forming temperature but collapsing readily at temperatures attained after the casting.

Briefly stated, the invention comprises granules of sand or the like coated with a nontacky layer comprising a potentially unstable thermosetting resin selected from the group consisting of the reaction products of formaldehyde with an isoalkylidene bisphenol, and formaldehyde with phenol and an isoalkylidene bisphenol.

The invention also comprises a bonded foundry sand in the form of shell molds and core inserts made with resin coated granules of the type set forth herein. The shell molds and cores have high strength following molding but are thermally unstable at temperatures above 600° F. and will readily collapse after exposure to such temperature, or at even lower temperatures with time, so as to permit removal of the mold parts from the casting.

Flexural strength and scratch hardness tests show that our resin molding sand compositions have high strength and hardness at the mold forming temperature and a strength greatly decreased, by at least 50 percent, after being subjected to further heating.

As to materials, the granules used are nonabsorbent. Examples of suitable materials are sand, particularly foundry sands, carborundum, emery, glass and asbestos fibers, and metal powder.

The resin used is a thermosetting material selected from the group consisting of the reaction products of (1) an isoalkylidene bisphenol with formaldehyde and (2) an isoalkylidene bisphenol with phenol and formaldehyde.

The isoalkylidene bisphenols used must be reactive with formaldehyde and include those corresponding to the formula:

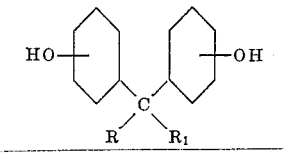

wherein R is a member of the group consisting of substituted and nonsubstituted $C_1$–$C_3$ alkyl radicals and R' is selected from the group consisting of methyl and ethyl radicals. Some specific examples are bis-Phenol A, i.e., 2,2-bis(4-hydroxy phenyl) propane, Diphenolic Acid, i.e., 4,4-bis 4-hydroxyphenyl-pentanoic acid, the bis-Phenol A isomers 2 (2-hydroxy-phenyl)-2'(4-hydroxyphenyl) propane and 2,2-bis (2-hydroxy-phenyl-propane and bisphenols based on phenol condensation products with ketones other than acetone, such as 2,2-bis(4-hydroxyphenyl) butane and 2,2-bis(4-hydroxyphenyl)3-methyl-butane.

The isoalkylidene diphenol-formaldehyde resins are prepared by condensing the selected ketone, such as acetone, methyl ethyl ketone and methyl isobutyl ketone, and phenol by standard methods and then reacting the crude condensate, without isolating it, with formaldehyde under alkaline conditions and then removing part of the water by decantation and stripping. The resins may also be prepared by reacting a commercial isoalkylidene bisphenol condensation product such as bis-Phenol A with the formaldehyde. The reaction is stopped preferably when the resin has attained a viscosity of at least U at 68–72 percent solids on the Gardner scale and cooled and concentrated to a viscosity on the said scale of W to Z at 74–76 percent solids.

The isoalkylidene bisphenol-phenol-formaldehyde resins, hereinafter referred to as hybrid resins, are preferably formed by adding the bisphenol to any conventional phenol-formaldehyde resin heretofore used in shell and core molding. Examples of these phenol-formaldehyde resins are set forth in U.S. Pat. No. 2,829,982 to Hoyt and Examples 2–4 of the instant application. Of these the phenol-formaldehyde resoles are preferred.

While the exact theory is not known, it is considered that, upon heating of this hybrid resin to cure the same, a condensation takes place whereby units of the bisphenol are included in the phenol-formaldehyde resin polymer chain.

The proportion of bisphenol in the resin can range from 10–70 percent by weight, based on the total resin solids, with 30–70 percent being the optimum range. A percentage above 70 percent of the bisphenol results in a resin which cannot be modified sufficiently to enable its use in present day commercial shell molding equipment.

The resins described above are used to coat granules such as foundry sands, to provide resin coated sands for the production of shell molds and cores having a high strength at 375° to 500° F. which are thermally degraded at temperatures above 600° F. so that they readily collapse. The granules are coated with the resin by any of the processes well known in the art.

Conveniently, the granules of sand are coated by admixing them with the resin in a muller to form free-flowing granules of sand each having a thin nontacky layer of the resin adhered thereto.

The resin coated sand is then formed into a shell mold or core by depositing it against the face of a heated pattern. The resin is cured at a shell forming temperature, such as 375° to 500° F., and thus fused to form an infusible thermoset resin bonded sand mold of high strength. After the molten metal, such as aluminum or magnesium, is poured into the mold the temperature of the mold is increased and the resin is degraded. The bonded sand form then collapses easily, the collapse permitting removal of the cast article.

As to proportions, 1–12 parts of the resin on the solids basis for 100 of the granule material can be used; a proportion of 1–7 parts is suitable for most commercial operations.

The invention will be further illustrated by detailed description in connection with the following specific examples for the practice of it. In these examples and elsewhere herein proportions are expressed as parts by weight.

EXAMPLE 1

One hundred parts of commercial bis-Phenol A and 56.4 parts of 44 percent formalin were charged into a reactor along with 4 parts of alcohol as a solvent. The mass was agitated, warmed to 70° C. and held at that temperature while 1.5 parts of 50 percent sodium hydroxide were slowly added over a period of 12 minutes. The mass was held at 70° C. until the viscosity of the resinous layer product increased to Gardner bubble viscosity X to Y at 71.9 percent resin solids. The condensate was then discharged from the reactor and cooled. The condensate was self-curing on a 150° F. hotplate and dried overnight at room temperature to a solid film.

One hundred parts of foundry sand (Pennsylvania Reference Sand 8N) were placed in a muller with 3.6 parts, based on resin solids, of the condensation product. Hot air at 400° F. was blown over the mulling mixture for about 10 minutes to remove substantially all the volatiles. The coated sand was screened while still warm, about 55° C., to give discrete, free-flowing sand grains from which shell molds and cores are produced directly.

Several cylindrical cores were blown in a Shalco Core Blowing Machine at 400° F. and 60 seconds cure using this resin coated sand. The core dimension was ½-inch diameter by 6 inches long. The hard, strong cores thus formed were placed centrally in a 1-inch diameter by 1½-inch deep cylindrical molded cavity formed in an oil-bonded sand mold. Brass at 1,950° F. was poured by means of a sprue and runner into the annular cavity. After 5 minutes the warm casting was removed and jolted for 10 jolts on a jolt machine. The core which had been surrounded by the casting fell out readily and completely as charred dark sand. Such aggregates as were visible were of such low strength that they could not be picked up with the fingers without total disintegration.

EXAMPLE 2

A coated sand was formed using the procedure set forth in Example 1 with the exception that 2.05 parts, based on resin solids, of a 2,2-bis (4-hydroxyphenyl propane and 2.05 parts, based on resin solids, of a commercial phenol-formaldehyde resole were substituted for the bis-Phenol A-formaldehyde resin disclosed therein. The result was free-flowing sand grains from which shell molds and cores were produced directly having the desired collapsibility.

The resole was prepared by charging 77.6 parts of phenol and 4.7 parts of 50 percent NaOH into a steel kettle. After heating to 95° C., 100 parts of 44 percent formaldehyde was slowly added at a rate to provide moderate reflux. After addition of the formaldehyde, heating was continued until a viscosity of U was obtained on the Gardner scale. The resole was cooled to 50° C. and vacuum concentrated to a specific gravity of 1.242 and a viscosity on the Gardner scale of W to Z at 70 percent resin solids.

EXAMPLE 3 a. A coated sand was formed using the procedure set forth in Example 2 except that the resin there used was substituted by 4.1 parts, based on resin solids, of the commercial phenol-formaldehyde resole of Example 2.

b. A second run was made using 4.2 parts of this phenol-formaldehyde resole in place of the the resin of Example 2. In both cases free-flowing sand grains were formed from which were produced shell molds and cores having low strength at 400° F. and increased strength at 600° F.

EXAMPLE 4

A coated sand was formed by placing 100 parts of Pennsylvania Reference Sand 8N in a muller with 3.6 parts, based on resin solids, of a conventional commercial novolac shell molding resin in powder form. Hexamethylene tetramine curing agent was added to cure the resin. The resin was coated onto the sand using the solvent method disclosed in U.S. Pat. No. 2,829,982.

The novolac resin was prepared by condensing at reflux, 100° C., 1 mole of phenol with 0.78 moles of formaldehyde in the presence of 0.2 percent sulfuric acid, based on the weight of phenol. The condensation was stopped when the odor of formaldehyde had disappeared and the reaction mixture was distilled until a sample of the cooled and crushed product reached a capillary melting point of 143°–153° F. The product was then dropped, hardened at room temperature, crushed, and ground for use.

EXAMPLE 5

Flexural strength tests, using the Tinius Olsen Stiffness test method, and scratch hardness tests, using the Dietert method, were carried out on 1×8×0.25 inches molded test specimens using the resin coated sand compositions of Examples 1–4.

The test pieces were molded into the size noted above hot cured for 6 minutes at 400° F. After cooling they were tested for scratch hardness and flexural strength. The pieces were then heated for 30 minutes at 600° F. and again tested for scratch hardness and flexural strength.

The opportunities are set forth in Table I along with the ratio of strength of the molded pieces at 600° F. as opposed to strength at 400° F.

TABLE I

| Example | 1 | 2 | 3a | 3b | 4 |
| --- | --- | --- | --- | --- | --- |
| (A) Flexural strength 400° F | 28.25 | 25.7 | 10.8 | 14.4 | 22.65 |
| (B) Flexural strength 600° F | 9.06 | 10.4 | 11.5 | 14.9 | 15.08 |
| (B)/(A) | .318 | .40 | 1.09 | 1.03 | .666 |
| Scratch hardness 400° F | 99 | 96 | 99 | 99 | 99 |
| Scratch hardness 600° F | 82 | 84 | 94 | 94 | 95 |

The results indicate the increased strength of molds formed from the resin coated sands of the present invention at 400° F. with a greater than 50 percent decrease in strength at 600° F.

EXAMPLE 6

The procedure of Example 1 above is followed except that the bisphenol there used is substituted by an equal proportion of 4,4-bis(4-hydroxyphenyl)-pentanoic acid, 2(2-hydroxyphenyl)-2′(4-hydroxyphenyl)propane, 2,2-bis(2-hydroxyphenyl)propane or 2,2-bis(4-hydroxyphenyl)-butane.

The granules are coated with the resin by any of the processes well known in the art. In addition other resins, solvents, waxes and additives common to shell molding practice may be used in admixture with the resins of the present invention.

The addition of an acid, such as sulfuric acid, to the shell or core after it is formed results in even greater collapsibility. Latent acidic materials, such as ammonium sulfate, can be added to the resin-sand mixture prior to shell formation. These latent materials must be of the type that do not degrade at the cure or shell forming temperature but only at the temperatures reached after casting.

It will be understood that it is intended to cover all changes and modifications of the examples of the invention herein chosen for the purpose of illustration which do not constitute departures from the spirit and scope of the invention.

We claim:

1. A molding composition comprising:
    1. One hundred parts by weight of a nonabsorbent granular material; and
    2. One to 12 parts by weight of a water-soluble resin coated on said material, said resin characterized as thermosetting and potentially thermally unstable, and being selected from the group of alkaline condensation products which have not been precipitated in acid, consisting of: (a) an isoalkylidene bisphenol with formaldehyde; and (b) an isoalkylidene bisphenol with phenol-formaldehyde; the proportion of said bisphenol being at least 10 percent but not exceeding 70 percent by weight of said resin.

2. The composition of claim 1 in which the isoalkylidene bisphenol corresponds to the formula

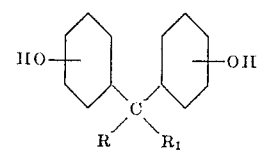

wherein R is selected from a group consisting of $C_1$–$C_3$ alkyl radicals and $C_1$–$C_3$ carboxy substituted radicals, and R' is a member of the group consisting of methyl and ethyl radicals.

3. The composition of claim 1 wherein said material is a foundry sand and said resin comprises the condensation product of 2,2-bis(4-hydroxphenyl) propane with formaldehyde.

4. The composition of claim 1 wherein said material is a foundry sand and said resin comprises the condensation product of 2,2-bis(4-hydroxyphenyl) propane with a phenol-formaldehyde resin.

5. The composition of claim 4 wherein said phenol-formaldehyde resin is a resole.

6. A collapsible mold comprising:
 1. One hundred parts by weight of a nonabsorbent granular material, and;
 2. One to 12 parts by weight of a resin bonding together said material, said resin characterized as thermoset and thermally unstable, and being selected from the group of cured alkaline condensation products which have not been precipitated in acid, consisting of:
  a. an isoalkylidene bisphenol with formaldehyde, and
  b. an isoalkylidene bisphenol with phenol-formaldehyde; the proportion of said bisphenol being at least 10 percent but not exceeding 70 percent by weight of said resin.

7. A mold as set forth in claim 6 wherein said material is a foundry sand and said resin is the condensation product of 2,2-bis(4-hydroxyphenyl) propane with formaldehyde.

8. A mold as set forth in claim 6 wherein said material is sand, said bisphenol constituting between 30–70 percent by weight of said resin and wherein said mold is shell mold.

9. In the method of making a collapsible mold the step of:
 a. coating 100 parts by weight of a nonabsorbent granular material with 1–12 parts by weight of a water-soluble resin, said resin characterized as thermosetting and potentially thermally unstable, and being selected from the group of alkaline condensation products consisting of:
  (a) an isoalkylidene bisphenol with formaldehyde; and
  (b) an isoalkylidene bisphenol with phenol-formaldehyde; the proportions of said bisphenol being at least 30 percent but not exceeding 70 percent by weight of said resin;
 b. heating said coated granules to a temperature of 375° F. to 500° F. to fuse said composition into a mold of high-flexural strength;
 c. cooling said fused composition below 375° F; and
 d. heating said fused composition to a temperature of at least 600° F. to degrade the fused composition.

* * * * *